United States Patent

[11] 3,631,330

| [72] | Inventor | William L. King<br>Springfield, Oreg. |
|------|----------|---------------------------------------|
| [21] | Appl. No. | 62,421 |
| [22] | Filed | Aug. 10, 1970 |
| [45] | Patented | Dec. 28, 1971 |
| [73] | Assignee | Nathan E. Knecht<br>Springfield, Oreg. |

[54] PARALLEL INVERTER WITH DUAL CAPACITOR COMMUTATION AND INDUCTIVE OUTPUT MEANS
2 Claims, 7 Drawing Figs.

| [52] | U.S. Cl. | 321/45 C |
|------|----------|----------|
| [51] | Int. Cl. | H02m 7/48 |
| [50] | Field of Search | 321/43–45,<br>45 C; 331/113.1 S |

[56] References Cited
UNITED STATES PATENTS

| 3,407,349 | 10/1968 | Lehrer et al. | 321/45 |
| 3,300,706 | 1/1967 | Wellford | 321/43 |
| 3,417,315 | 12/1968 | Corey | 321/45 |
| 3,249,844 | 5/1966 | Jensen | 321/44 |
| 3,263,153 | 7/1966 | Lawn | 321/45 |
| 3,364,408 | 1/1968 | Katz et al. | 321/45 |
| 3,424,973 | 1/1969 | Smyth | 321/45 |

*Primary Examiner*—William M. Shoop, Jr.
*Attorney*—Kolisch & Hartwell

ABSTRACT: An inverter for converting DC to AC employing, in two parallel-disposed branches, silicon-controlled rectifiers each connected in series with a pair of diodes and an air-core coil. Interconnecting such branches are two commutating capacitors each having its opposite sides connected to the corresponding sides of corresponding diodes in the branches. The two branches mentioned are connected across an iron-core output inductor.

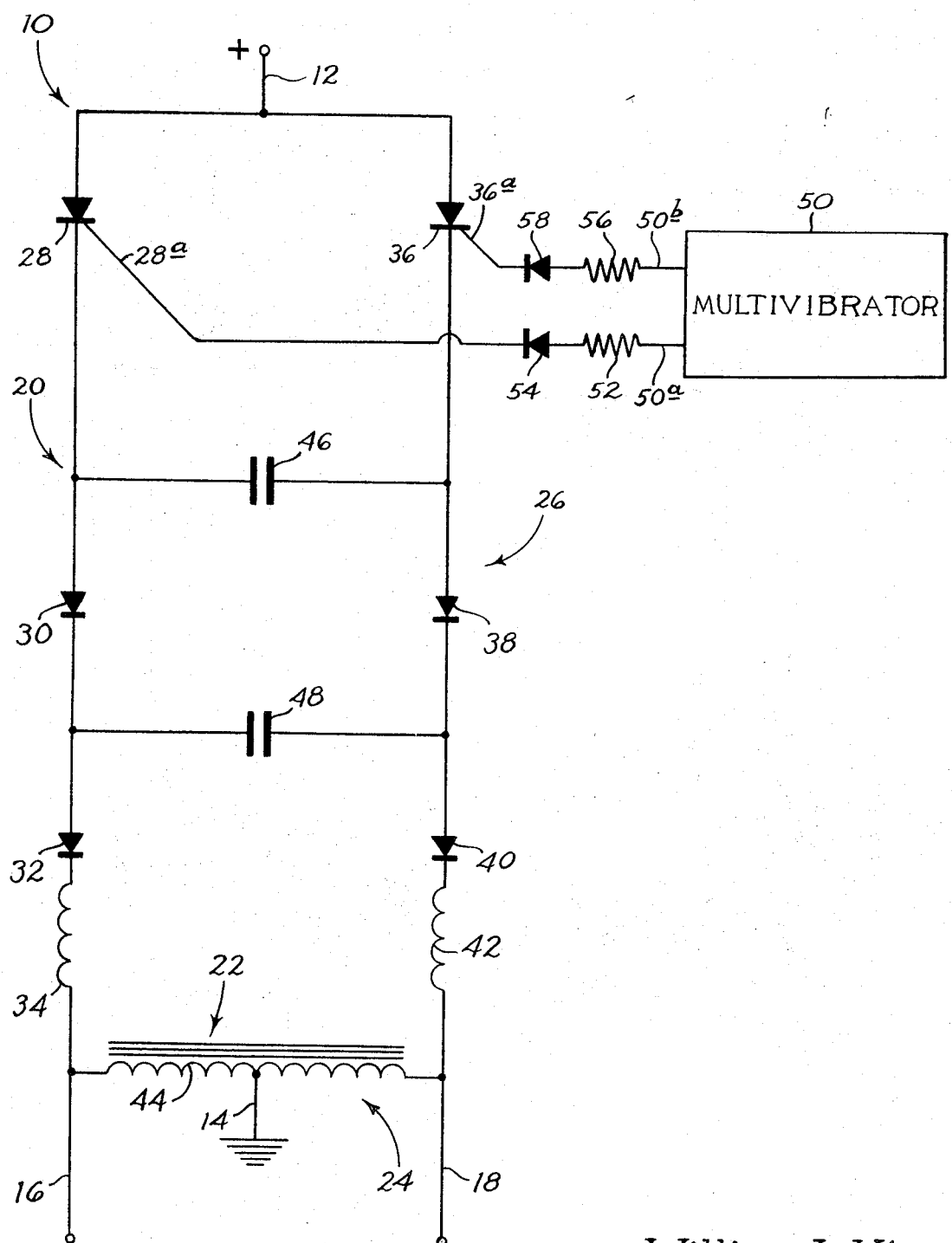

3,631,330

PARALLEL INVERTER WITH DUAL CAPACITOR COMMUTATION AND INDUCTIVE OUTPUT MEANS

BACKGROUND AND SUMMARY OF THE INVENTION

This invention pertains to a parallel electrical inverter for converting DC to AC. More specifically, it pertains to such an inverter which employs a pair of capacitors for commutation purposes, and an output inductor.

Electrical inverters have a wide range of applications. One application which has become of particular interest in recent years is the equipping of vehicles, such as trucks and cars, with such a device whereby AC current may be provided at will at the location of the vehicle for operating various kinds of AC power equipment, such as lights, saws, drills, etc.

A problem in the past, however, has been that inverters capable of delivering AC at desired power levels have been relatively large and bulky, and quite expensive. And, such characteristics have limited their utility.

A general object of the present invention, therefore, is to provide a novel inverter, employable in an application of the type briefly mentioned above, which in a practical and satisfactory manner avoids the problems indicated.

More specifically, an object of the invention is to provide a novel inverter which is both compact in size and inexpensive.

Another object of the invention is to provide such an inverter which is relatively simple in construction and reliable.

Still another object of the invention is to provide an inverter of the type outlined which, even in relatively small physical sizes, is capable of delivering relatively large amounts of AC power.

According to a preferred embodiment of the invention, the proposed inverter comprises a pair of parallel branches interposed between one of its input terminals and its two output terminals, each branch including a silicon-controlled rectifier for switching purposes. Connected in series with each silicon-controlled rectifier in a branch are a pair of diodes and an air-core coil. Proper commutation of the silicon-controlled rectifiers, under all load conditions, is accomplished by a pair of capacitors which interconnect the two branches mentioned. An iron-core output coil, or inductor, is connected between the output terminals in the inverter.

The various components contemplated for the inverter are, thus, few in number; and they may be incorporated in a relatively compact assembly. Without destroying compactness, the components may be selected with appropriately sized electrical characteristics to be capable of delivering relatively large amounts of AC power. The novel arrangement of diodes, coils and capacitors assures reliable commutation of the silicon-controlled rectifiers in the inverter under all kinds of expected load conditions—even including a short circuit.

DESCRIPTION OF THE DRAWINGS

These and other objects and advantages attained by the invention will become more fully apparent as the description which follows is read in conjunction with the accompanying drawing which comprises a circuit diagram of a preferred embodiment of the invention.

DETAILED DESCRIPTION OF THE INVENTION

Referring to the drawing, indicated generally at 10 is an inverter as contemplated herein. The inverter includes a pair of DC input terminals 12, 14, and a pair of AC output terminals 16, 18. Interconnecting the different adjacent pairs of input and output terminals are four branch circuits indicated generally at 20, 22, 24, 26.

Branch circuit 20, which interconnects terminals 12, 16, includes, in series, a silicon-controlled rectifier (or gateable switching device) 28, a pair of diodes (or rectifying means) 30, 32, and an air-core coil (or inductive means) 34. Branch circuit 26, which interconnects terminals 12, 18, is substantially the same as circuit 20, and includes a silicon-controlled rectifier 36 (corresponding to rectifier 28), a pair of diodes 38, 40 (corresponding to diodes 30, 32, respectively), and an air-core coil 42 (corresponding to coil 34). Rectifiers 28, 36 include the usual gates 28a, 36a, respectively, for receiving suitable positive-voltage gating signals to place the rectifiers in conducting states. It will be noted that the rectifiers and diodes in branches 20, 26 are poled to conduct from input terminal 12 toward output terminals 16, 18, respectively.

Branch circuits 22, 24 in the embodiment illustrated comprise adjacent end portions of a center-tapped magnetically permeable-core coil, or inductive device, 44. The core for this coil may comprise any suitable magnetically permeable material, and in the present instance comprises iron. The center tap of coil 44 is connected to input terminal 14. If desired, for a particular situation, coil 44 may comprise one side of a step-up or stepdown transformer.

Provided as contemplated herein for assuring proper commutation of rectifiers 28, 36 under all types of expected load conditions are capacitors 46, 48. Capacitor 46 interconnects the junction between rectifier 28 and diode 30 and the junction between rectifier 36 and diode 38. Capacitor 48 interconnects the junction between diodes 30, 32 and the junction between diodes 38, 40.

Inverter 10 is adapted to be employed, for example, in conjunction with the usual DC electrical system provided in a vehicle, such as a truck or car. In such a case, it may be operated either under low-voltage conditions directly from the battery in the vehicle, or it may be operated under higher voltage conditions from the usual alternator or generator provided in the vehicle. In either case, terminal 12 is connected to the positive side of the DC supply in the vehicle, and terminal 14 is connected to the negative side of the supply. Typically, the negative side of such a supply is grounded in the vehicle, and accordingly, terminal 14 is shown grounded in the drawing.

Obviously, inverter 10 may be used in other applications, and with other particular kinds of DC supplies.

Gating pulses from the gates in rectifiers 28, 36 may be supplied from any suitable source producing a pair of trains of positive-voltage pulses, with the pulses in each train alternating (in time) with those in the other train. Such a source may comprise a conventional electromechanical vibrator-type multivibrator indicated in block form in the drawing at 50. Multivibrator 50 may be powered from any suitable supply, such as the battery in a vehicle. When powered, it produces trains of positive square wave voltage pulses at its two output terminals, indicated at 50a, 50b, with the pulses produced at terminal 50a alternating in time with those produced at terminal 50b. The pulses in each train occur at a pulse rate of about 60 pulses per second, and last for slightly less than one-sixtieth of a second. Terminal 50a is connected to gate 28a through a resistor 52 and a diode 54. Similarly, terminal 50b is connected to gate 36a through a resistor 56 and a diode 58.

With DC voltage supplied input terminals 12, 14 (with terminal 12 positive relative to terminal 14), and with multivibrator 50 operating, AC voltage and current is made available at output terminals 16, 18 at a frequency of about 60 cycles per second. Rectifiers 28, 36 alternate between conducting and nonconducting states, with only one rectifier in a conducting state at a given time. Proper turning-off (or commutating) of a rectifier as the other one is turned on results from the operation of capacitors 46, 48 connected as indicated with diodes 30, 32, 38, 40 and coils 34, 42. Experience has shown that with the novel circuitry proposed herein such turning-off occurs predictably under all types of load conditions. In other words, accidental locking-on of a rectifier does not occur. In fact, proper commutation occurs even with a short circuit placed between terminals 16, 18.

Through proper selection of the electrical sizes of the components employed in the inverter, relatively large amounts of AC power (i.e., several thousands of watts) may be delivered. And, because of the relatively small number of parts employed, the inverter may be relatively compact in size, and inexpensive.

While an embodiment of the invention has been described herein, it is appreciated that variations and modifications may be made without departing from the spirit of the invention.

It is claimed and desired to secure by Letters Patent:

1. A parallel inverter for converting DC to AC comprising
a pair of input terminals adapted to be connected to a source of DC, and a pair of output terminals for supplying AC,
a first pair of branch circuits, each interconnecting one of said input terminals and a different output terminal, and each including, in series, a silicon-controlled rectifier having its anode connected directly to said one input terminal, a first diode having its anode connected directly to the cathode of said silicon-controlled rectifier, a second diode having its anode connected directly to the cathode of said first diode, and an inductor connected directly to the cathode of said second diode,
a pair of capacitors having one set of sides connected to opposite sides of said first diode in one of said branch circuits, and their other set of sides connected to the opposite sides of said first diode in the other branch circuit, and
a second pair of branch circuits, each interconnecting a different output terminal and the other input terminal, and each including an inductor which is different from said first-mentioned inductors.

2. The inverter of claim 1, wherein each capacitor has its opposite sides connected to corresponding sides of the first diodes in said first pair of branch circuits.

* * * * *